Jan. 4, 1927.
W. G. WILSON
1,613,072
PACKING RING FOR VALVES
Filed Jan. 6, 1926
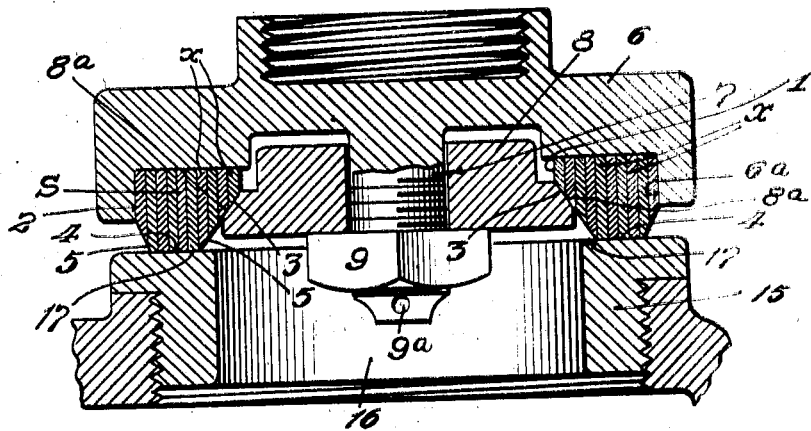
INVENTOR
Wylie Emanuel Wilson
BY Edward S. Beach
ATTORNEY Patented Jan. 4, 1927.

1,613,072

UNITED STATES PATENT OFFICE.

WYLIE GEMMEL WILSON, OF ELIZABETH, NEW JERSEY.

PACKING RING FOR VALVES.

Application filed January 6, 1926. Serial No. 79,568.

This invention relates to packing rings for valves. Its object is to produce a rigid, precompacted or precondensed sealing or packing ring made up of united, dense laminæ of asbestos or the like, and possessing my new features of invention set forth below.

In the accompanying drawing forming a part hereof and illustrating the invention in the best form now known to me, The figure is a vertical, central section showing one form of my new packing ring mounted in one form of packing ring holder in cooperative relation to one form of ported valve seat structure.

Referring to the drawing of the invention the packing or sealing ring is made up of compressed or compacted, superposed, united laminæ preferably of asbestos, the laminæ being usually vulcanized together. This ring or annulus is made dense and stiff by the compression of the united laminæ and yet is slightly elastic and very slightly compressible. It substantially retains its form under pressure. Being made of united layers, it must be kept compressed and supported while in use, because it softens to a considerable but variable extent when subjected to steam or other fluid under pressure, the edges of the laminæ in the sealing surface then tending to separate to a greater or less degree, as is usual in the asbestos packing rings made of a strip wound upon itself and having flat, parallel faces, one of which flat faces forms a sealing surface.

In the illustrated form of the present invention, the packing or sealing ring S is made up of asbestos laminæ $x$ compressed or compacted and united together, the ring having the characteristics above noted. In my new packing ring herein shown, the ring has a central opening 1; opposed clampable walls 2 and 3; and on its sealing face side, a sealing surface 4 which is between backwardly tapered portions 5, each tapered portion 5 being between the sealing surface 4 and the clampable wall 2 or 3. The sealing surface is formed of edges of the united laminæ and in use contacts with a valve seat wall. The tapered surfaces 5 are laminæ edges, there being at least one tapered lamina edge in each tapered portion 5. While these tapered edges perform no direct function in sealing, they definitely serve as supports one for the other and for the intermediate laminæ and also serve as spacers to hold the sealing surface 4 apart from mechanical means clampably engaging the clampable surfaces of the ring. The result is that when the sealing ring is installed and clamped in position in a valve, the sealing edges in the sealing surface are given effective resistance against fraying and tearing, whereby the sealing ring is given a longer wearing life and non-leakage of the seated valves is more certainly insured than has been the case heretofore. If the sealing edge of any one lamina becomes disrupted by fraying or tearing due to seating pressure or to pressure of liquids flowing through the valve such fray or tear is apt to extend into one or more adjacent sealing surface forming edges of the laminæ and produce a leaky valve. In the present stage of technical development, the high pressure and the great velocity of travel of fluids through valves makes it very difficult to secure and maintain valves in a non-leaking condition and this invention is directed to overcoming the difficulty.

In the form of the invention shown, the sealing ring is mounted in a cupped sealing ring holder 6 having a central, threaded stud 7 through a clamping plate 8 that is provided backwardly of its face with a bevelled peripheral wall 8ª that contacts with the interior, clampable wall 3 of the ring S. Clamping plate 8 is retained in clamping position by a nut 9 in turn secured in place by a cotter pin 9ª. The peripheral clampable wall 2 of the ring is clamped against a side wall 6ª of the cupped holder 6. The face of the plate 8 lies within the ring back of the tapered portions 5 of the ring between which the sealing surface 4 (shown flat in Fig. 1) is located. The sealing surface 4 projects beyond the adjacent tapered surfaces 5. The latter are intermediate of the sealing surface and the opposed clampable surfaces 2 and 3. The back wall of the ring is in contact with the bottom of the cupped holder 6. The laminæ in the sealing surface 4 are perpendicular to a flat valve seat, the seat and the sealing surface being adapted for contact to form the sealing joint.

The sealing ring S contacts with a valve seat surrounding a port. The port is an opening through a member 15. The port wall is indicated by 16 and the valve seat by 17. Features of my invention not herein claimed are set forth in my application Ser.

No. 79,571 for lifting valves, and Ser. No. 79,574 for gate valves, both filed Jan. 6, 1926.

What I claim is:

As a new article of manufacture, a dense, slightly elastic, valve port sealing annulus of united laminæ and which annulus has a projecting sealing surface composed of laminæ edges between adjacent, tapering laminæ edges and which annulus also has clampable surfaces one adjacent each tapered laminæ edge portion; the tapered laminæ serving, when in use, to sustain one another and also to sustain the laminæ edges in the sealing surface, and then also serving as spacers to hold the sealing surface edges apart from clamping means for engaging said clampable surfaces, one of said clampable surfaces being a peripheral wall portion and the other being an interior, conical portion of the annulus.

Signed at New York in the county of New York and State of New York this 23" day of December, A. D. 1925.

WYLIE GEMMEL WILSON.